(12) United States Patent
Nakamura et al.

(10) Patent No.: US 12,192,091 B2
(45) Date of Patent: Jan. 7, 2025

(54) TOPOLOGY ESTIMATION SYSTEM, TRAFFIC GENERATION APPARATUS, AND TRAFFIC GENERATION METHOD

(71) Applicant: Nippon Telegraph and Telephone Corporation, Tokyo (JP)

(72) Inventors: Mizuto Nakamura, Musashino (JP); Naoyuki Tanji, Musashino (JP); Toshihiko Seki, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 324 days.

(21) Appl. No.: 17/624,438

(22) PCT Filed: Jul. 3, 2019

(86) PCT No.: PCT/JP2019/026418
§ 371 (c)(1),
(2) Date: Jan. 3, 2022

(87) PCT Pub. No.: WO2021/001952
PCT Pub. Date: Jan. 7, 2021

(65) Prior Publication Data
US 2022/0385559 A1  Dec. 1, 2022

(51) Int. Cl.
*H04W 28/02* (2009.01)
*H04L 41/0893* (2022.01)
*H04L 41/12* (2022.01)
*H04L 45/02* (2022.01)
*H04L 47/10* (2022.01)
*H04W 72/04* (2023.01)

(52) U.S. Cl.
CPC .......... *H04L 45/02* (2013.01); *H04L 41/0893* (2013.01); *H04L 41/12* (2013.01); *H04L 47/10* (2013.01)

(58) Field of Classification Search
None
See application file for complete search history.

(56) References Cited

U.S. PATENT DOCUMENTS

| | | | | |
|---|---|---|---|---|
| 6,333,703 | B1 * | 12/2001 | Alewine | G08G 1/096775 340/995.13 |
| 7,802,012 | B2 * | 9/2010 | Simonis | H04L 41/147 709/242 |
| 10,291,349 | B2 * | 5/2019 | Khandekar | H04L 1/1861 |
| 11,872,999 | B2 * | 1/2024 | She | B60W 30/182 |

(Continued)

FOREIGN PATENT DOCUMENTS

JP        2014049851        3/2014

*Primary Examiner* — Sai Aung
(74) *Attorney, Agent, or Firm* — Fish & Richardson P.C.

(57) ABSTRACT

A topology estimation system that estimates the connection relationship of interfaces of a plurality of devices includes: a topology estimation device 1 that estimates the connection relationship of the interfaces from the correlation of traffic observed at each of the interfaces connected to each other; and a traffic generation device 4 that generates traffic to be transmitted to the interfaces. The traffic generation device 4 includes: a traffic generation unit 42 that generates traffic so that a different feature amount appears for each set of the interfaces connected to each other; and a traffic transmitting unit 43 that transmits the traffic to the interfaces.

17 Claims, 16 Drawing Sheets

(56) References Cited

U.S. PATENT DOCUMENTS

| | | | | |
|---|---|---|---|---|
| 2007/0036116 | A1* | 2/2007 | Eiger | H04W 28/02 370/338 |
| 2010/0150004 | A1* | 6/2010 | Duffield | H04L 41/0681 370/252 |
| 2012/0289224 | A1* | 11/2012 | Hallberg | H04W 52/0206 455/424 |
| 2014/0192683 | A1* | 7/2014 | Hallivuori | H04L 41/0806 370/254 |
| 2014/0192811 | A1* | 7/2014 | Hallivuori | H04L 45/745 370/392 |
| 2019/0166106 | A1* | 5/2019 | Munro | H04L 63/0876 |
| 2020/0296023 | A1* | 9/2020 | Kumar | H04L 43/12 |

\* cited by examiner

TOPOLOGY ESTIMATION SYSTEM, TRAFFIC GENERATION APPARATUS, AND TRAFFIC GENERATION METHOD

CROSS-REFERENCE TO RELATED APPLICATIONS

This application is a National Stage application under 35 U.S.C. § 371 of International Application No. PCT/JP2019/026418, having an International Filing Date of Jul. 3, 2019. The disclosure of the prior application is considered part of the disclosure of this application, and is incorporated in its entirety into this application.

TECHNICAL FIELD

The present invention relates to a topology estimation system, a traffic generation device, and a traffic generation method.

BACKGROUND ART

A technique for grasping the connection relationship of devices on the basis of the correlation of traffic flow rates between the interfaces of devices constituting a communication network is known (see PTL 1). In the technique of PTL 1, the traffic flow rate at each interface is obtained, and it is estimated that interfaces having the same traffic flow rate are connected at the same time.

CITATION LIST

Patent Literature

[PTL 1] Japanese Patent Application Publication No. 2014-049851

SUMMARY OF THE INVENTION

Technical Problem

However, in the conventional method, there is a problem that it is difficult to estimate the correct connection relationship because there is no difference in the traffic flow rate at each interface when the traffic does not fluctuate.

For example, a communication network provided by a telecommunications carrier includes an operating system and a non-operating system that is a backup system in the event of a failure. In the non-operating system, since the traffic flow rate of each interface is almost constant and there is no characteristic change, it is difficult to grasp the connection relationship of devices from the correlation of traffic flow rates. Further, even in the operating system, when the traffic flow rate is small, it is difficult to grasp the connection relationship of devices.

The present invention has been made in view of the above problems, and an object thereof is to more accurately grasp the connection relationship of interfaces in a network in which the change in traffic flow rate is small.

Means for Solving the Problem

A topology estimation system according to an aspect of the present invention is a topology estimation system that estimates the connection relationship of interfaces of a plurality of devices, including: a topology estimation device that estimates the connection relationship of the interfaces from the correlation of traffic observed at each of the interfaces connected to each other; and a traffic generation device that generates traffic to be transmitted to the interfaces, the traffic generation device including: a traffic generation unit that generates traffic so that a different feature amount appears for each set of the interfaces connected to each other; and a traffic transmitting unit that transmits the traffic to the interfaces.

A traffic generation device according to an aspect of the present invention is a traffic generation device that generates traffic for estimating the connection relationship of interfaces connected to each other from the correlation of the traffic observed at each of the interfaces, comprising: a traffic generation unit that generates traffic so that a different feature amount appears for each set of the interfaces connected to each other; and a traffic transmitting unit that transmits the traffic to the interfaces.

A traffic generation method according to an aspect of the present invention is a traffic generation method of generating traffic for estimating the connection relationship of interfaces connected to each other from the correlation of the traffic observed at each of the interfaces, including: generating traffic so that a different feature amount appears for each set of the interfaces connected to each other; and transmitting the traffic to the interfaces.

Effects of the Invention

According to the present invention, it is possible to grasp the connection relationship of interfaces more accurately in a network where the change in traffic flow rate is small.

DESCRIPTION OF EMBODIMENTS

First Embodiment

A topology estimation system of a first embodiment will be described with reference to FIG. 1.

The topology estimation system illustrated in the figure includes a topology estimation device 1, a traffic generation device 4, and a traffic collection device 5. In the topology estimation system, the traffic generation device 4 applies traffic to an estimation target network so that characteristic traffic is observed at each of the interfaces of the devices constituting the estimation target network. The traffic collection device 5 collects traffic data at each interface. The topology estimation device 1 estimates the connection relationship (topology) of the interface of the device from the traffic data.

Figure 1:
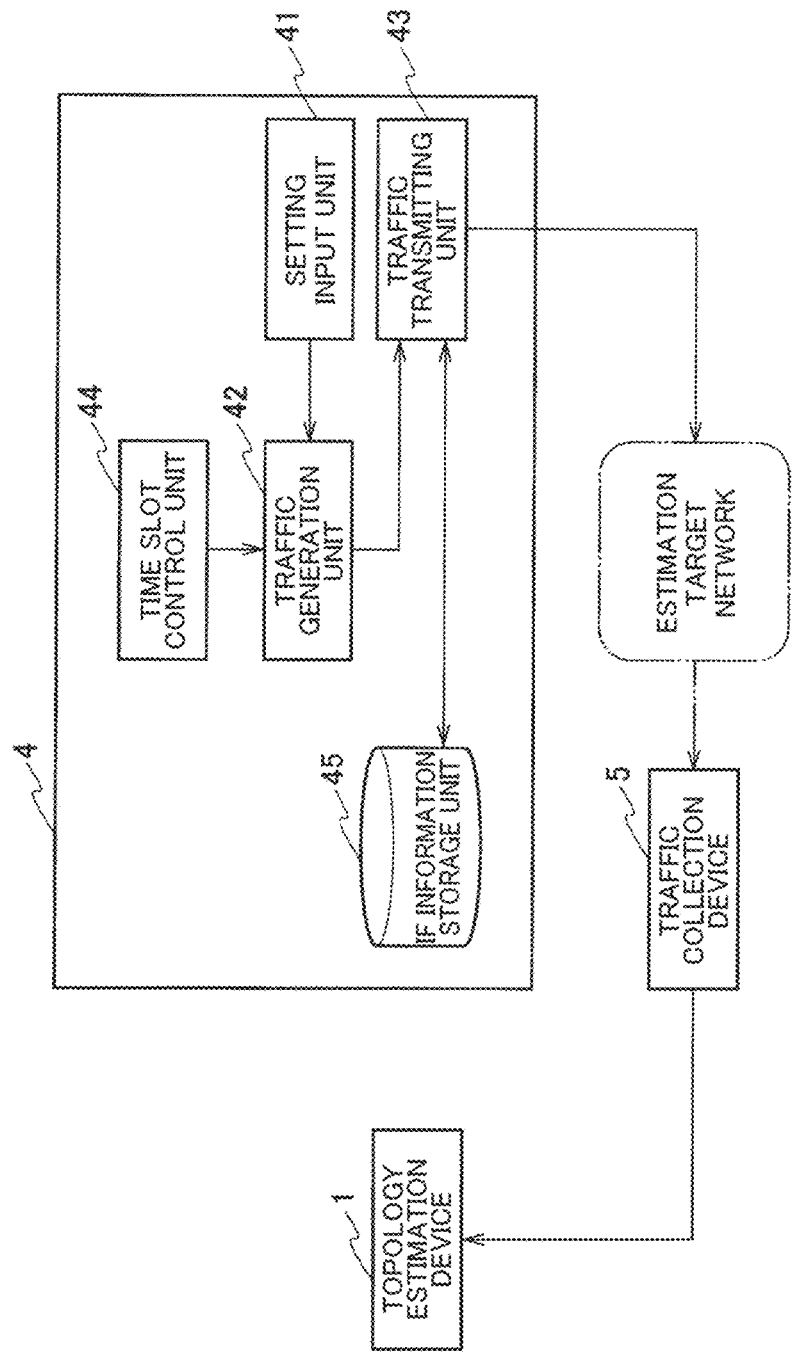
FIG. 1 is a diagram illustrating a configuration example of a topology estimation system according to a first embodiment.

The traffic generation device 4 illustrated in FIG. 1 includes a setting input unit 41, a traffic generation unit 42, a traffic transmitting unit 43, a time slot control unit 44, and an IF information storage unit 45.

The setting input unit 41 determines a traffic parameter such that a different feature amount appears in each set of interfaces connected to each other in the estimation target network. In the first embodiment, the setting input unit 41 calculates the amount of traffic destined to each of the interfaces of the devices constituting the estimation target network so that the observed traffic amount is different for each set of interfaces connected to each other.

The traffic generation unit 42 generates a different amount of traffic for each destination interface on the basis of the parameter determined by the setting input unit 41. For example, the traffic generation unit 42 generates a packet having a data size such that the amount of traffic calculated by the setting input unit 41 is applied in a predetermined period.

The traffic transmitting unit 43 transmits the traffic generated by the traffic generation unit 42 to the estimation target network. For example, when transmitting traffic to the estimation target network, the traffic transmitting unit 43 assigns an IP address corresponding to the destination interface to the packet. The IP address corresponding to the interface can be identified using the information managed in a configuration management database (not illustrated) or the like. In the present embodiment, the association between the interface and the IP address is stored in the IF information storage unit 45. The traffic generation device 4 may acquire information on the interfaces of the devices constituting the estimation target network from the topology estimation device 1.

The time slot control unit 44 assigns each of the destinations to some time slots and controls the traffic generation timing for each of the destinations of the traffic generation unit 42. For example, the time slot control unit 44 prepares two time slots T1 and T2, assigns some destinations to the time slot T1, and assigns the remaining destinations to the time slot T2. The time slot control unit 44 causes the traffic generation unit 42 to generate traffic to the destination assigned to the time slot T1 during the period of the time slot T1. The time slot control unit 44 causes the traffic generation unit 42 to generate traffic to the destination assigned to the time slot T2 during the period of the time slot T2. The time slot control unit 44 is not an essential configuration, and is used when the amount of traffic that can be flowed at one time is limited.

The IF information storage unit 45 holds information about the interfaces provided in the devices constituting the estimation target network. For example, for each of the interfaces, information such as an IP address corresponding to the interface is held.

The traffic collection device 5 collects traffic data from the estimation target network. Specifically, the traffic collection device 5 acquires the packet transmission amount and the packet reception amount for each interface provided in the device constituting the estimation target network, and transmits the same to the topology estimation device 1 together with the acquisition time (time stamp). Each of the devices of the estimation target network may transmit traffic data to the traffic collection device 5, or the traffic collection device 5 may acquire the traffic data of each of the devices of the estimation target network.

Figure 2:
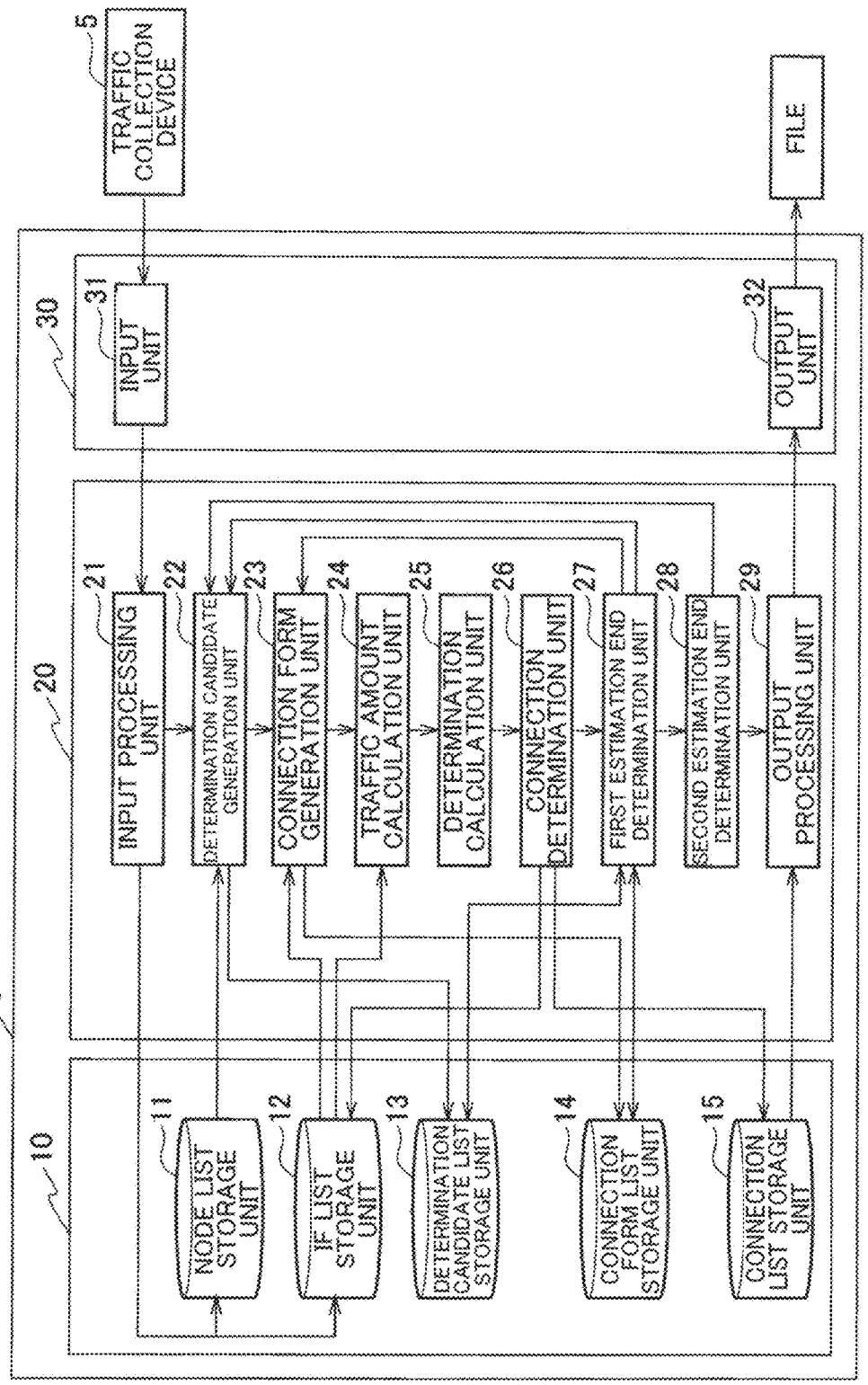
FIG. 2 is a diagram illustrating a configuration example of a topology estimation device.

The topology estimation device 1 will be described with reference to FIG. 2. The topology estimation device 1 is a device that estimates the connection relationship of interfaces from the correlation of the traffic amount for each interface of a plurality of devices constituting the estimation target network. As the topology estimation device 1, the device described in PTL 1 can be used.

The topology estimation device 1 includes a storage unit 10, a processing unit 20, and an input/output unit 30.

The storage unit 10 includes a node list storage unit 11, an IF list storage unit 12, a determination candidate list storage unit 13, a connection form list storage unit 14, and a connection list storage unit 15.

The node list storage unit 11 stores a node list in which a list of topology estimation target nodes (devices constituting the estimation target network) is registered.

The IF list storage unit 12 stores an IF list in which the interfaces of each node are registered for each of the nodes registered in the node list.

The determination candidate list storage unit 13 stores a determination candidate list in which a set of nodes that are candidates for connection determination is registered as a determination candidate.

The connection form list storage unit 14 stores a connection form list in which connection forms including a set of all possible interface is registered for each set of determination candidate nodes registered in the determination candidate list.

The connection list storage unit 15 stores a connection list in which the connection form obtained as the estimation result of the topology is registered.

The processing unit 20 includes an input processing unit 21, a determination candidate generation unit 22, a connection form generation unit 23, a traffic amount calculation unit 24, a determination calculation unit 25, a connection determination unit 26, a first estimation end determination unit 27, a second estimation end determination unit 28 and an output processing unit 29.

The input processing unit 21 receives the input data of the node list and the IF list of the estimation target network and stores the same in the node list storage unit 11 and the IF list storage unit 12.

The determination candidate generation unit 22 acquires a node list from the node list storage unit 11, extracts a set of all nodes that are determination candidates, and stores the same in the determination candidate list storage unit 13. Further, the determination candidate generation unit 22 selects the beginning one of the determination candidates registered in the determination candidate list and delivers the same to the connection form generation unit 23.

The connection form generation unit 23 receives the determination candidate from the determination candidate generation unit 22, acquires the IF list of each node included in the determination candidate from the IF list storage unit 12, extracts a connection form consisting of a set of all possible interfaces, and stores the same in the connection form list storage unit 14. Further, the connection form generation unit 23 selects the beginning one of the connection forms registered in the connection form list and delivers the same to the traffic amount calculation unit 24.

The traffic amount calculation unit 24 calculates a total packet transmission amount and a total packet reception amount in the connection form for each node having the interfaces included in the connection form delivered from the connection form generation unit 23, and delivers the same to the determination calculation unit 25 together with the connection form information.

The determination calculation unit 25 compares the total packet transmission amount and the total packet reception amount for each connection type on the basis of the connection type information delivered from the traffic amount calculation unit 24 and the packet transmission/reception amount for each node to determine whether a predetermined condition is satisfied. The determination calculation unit 25 delivers the determination result to the connection determination unit 26 together with the connection form information.

The connection determination unit 26 stores the connection form information in the connection list storage unit 15 when the determination result is positive on the basis of the connection form information and the determination result delivered from the determination calculation unit 25. Further, the connection determination unit 26 deletes the interface data included in the connection form from the IF list of the IF list storage unit 12. Further, the connection determination unit 26 delivers the connection form information to the first estimation end determination unit 27.

The first estimation end determination unit 27 deletes the determined connection form information delivered from the connection determination unit 26 from the connection form list storage unit 14. When other connection form information remains in the connection form list storage unit 14, the first estimation end determination unit 27 requests the connection form generation unit 23 to process the next connection form. When the other connection form information does not remain in the connection form list storage unit 14, the first estimation end determination unit 27 activates the second estimation end determination unit 28.

The second estimation end determination unit 28 causes the determination candidate generation unit 22 to increase the number of nodes to be extracted as determination candidates and repeat the process. When the number of nodes to be extracted as a determination candidate exceeds the total number of nodes to be estimated, the output processing unit 29 is caused to output the estimated topology.

The output processing unit 29 acquires the connection list from the connection list storage unit 15 and outputs the contents to a file or the like via the output unit 32.

The input/output unit 30 includes an input unit 31 and the output unit 32. The input unit 31 delivers the input data of the node list and the IF list of the estimation target network to the input processing unit 21. The output unit 32 outputs the connection list delivered from the output processing unit 29 to a file or the like.

Figure 3:
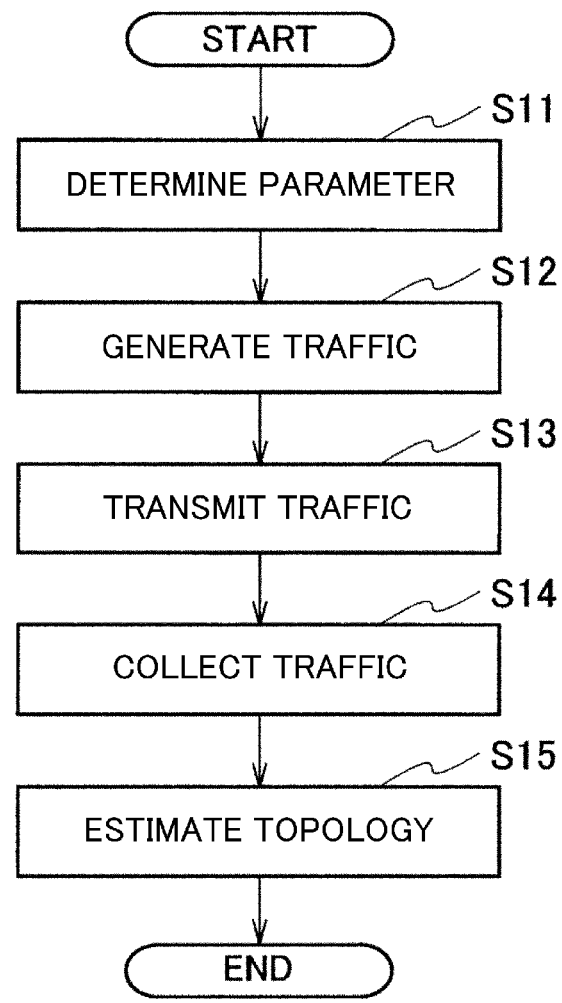
FIG. 3 is a flowchart illustrating a processing flow of the topology estimation system of the first embodiment.

The processing flow of the topology estimation system of the present embodiment will be described with reference to FIG. 3.

In step S11, the traffic generation device 4 acquires information on the interfaces of the devices constituting the estimation target network, and determines the parameters of traffic destined to each of the interfaces so that the amount of traffic observed at each of the interfaces is different. The parameters include, for example, the size and the transmission time of the packet to be transmitted as traffic.

In step S12, the traffic generation device 4 generates traffic on the basis of the parameters determined in step S11.

In step S13, the traffic generation device 4 transmits the traffic generated in step S12 to the estimation target network.

In step S14, the traffic collection device 5 collects traffic data at each of the interfaces of the devices constituting the estimation target network.

In step S15, the topology estimation device 1 inputs the traffic data collected in step S14 to estimate the topology of the estimation target network, displays the estimation result, and saves the estimation result in a file.

An embodiment of estimating the connection relationship between two devices connected to face each other will be described with reference to FIG. 4.

Figure 4:
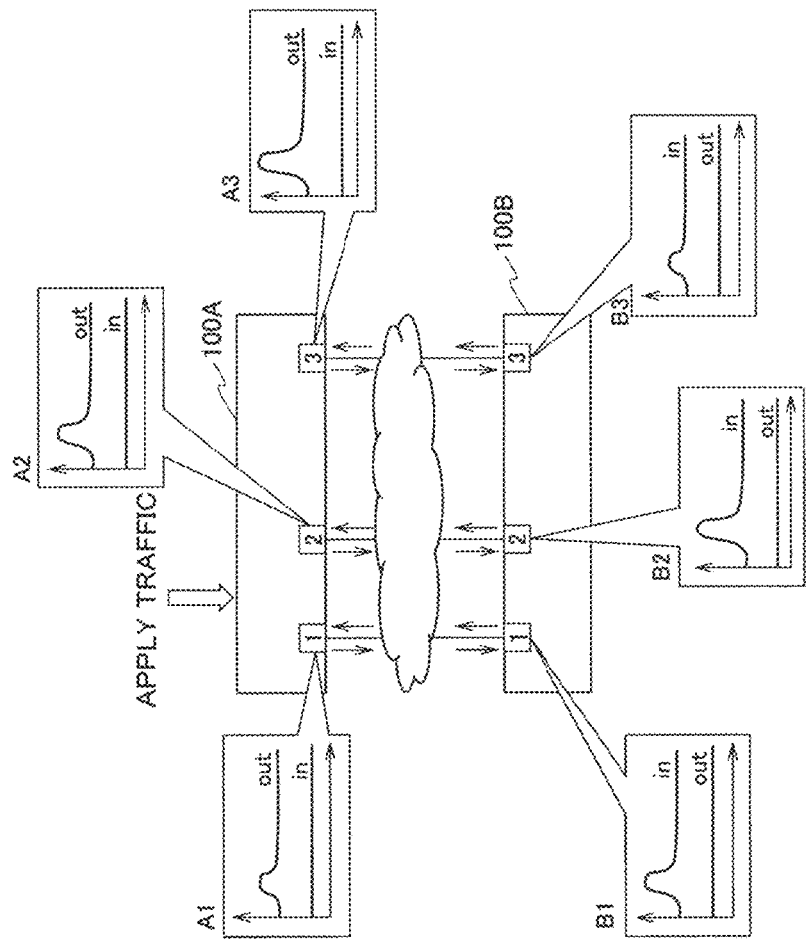
FIG. 4 is a diagram for explaining an embodiment of estimating the connection relationship between two devices connected to face each other.

In the example of FIG. 4, two devices 100A and 100B are connected to face each other.

The devices 100A and 100B each include three interfaces. The number of interfaces of the devices 100A and 100B is an example for simplifying the explanation.

In the present embodiment, the traffic generation device 4 applies traffic destined to each of the interfaces of the device 100B from the device 100A. At this time, the traffic generation device 4 makes the flow rate of the applied traffic different for each destination interface. The time to apply the traffic is uniform. The traffic collection device 5 collects traffic data at each of the interfaces of the devices 100A and 100B. The topology estimation device 1 estimates the connection relationship of the interfaces of the devices 100A and 100B from the correlation of the traffic data.

Each of the traffics destined to the interfaces of the device 100B applied to the device 100A is transmitted from the interface of the device 100A and received at the interface of the destination device 100B. For example, assuming that the interface 1 of the device 100A and the interface 3 of the device 100B are connected, the traffic destined to the interface 3 of the device 100B applied to the device 100A is transmitted from the interface 1 of the device 100A and is received by the interface 3 of the device 100B.

The traffic generation device 4 generates traffic having different flow rates for each destination, whereby the topology estimation device 1 can estimate the connection relationship of interfaces from the correlation of the traffic data. In the example of FIG. 4, the amount of traffic flowing out from the interface 1 of the device 100A and the amount of traffic flowing into the interface 3 of the device 100B are correlated. The amount of traffic flowing out from the interface 2 of the device 100A and the amount of traffic flowing into the interface 1 of the device 100B are correlated. The amount of traffic flowing out from the interface 3 of the device 100A and the amount of traffic flowing into the interface 2 of the device 100B are correlated. Therefore, it can be estimated that the interfaces 1, 2, and 3 of the device 100A are connected to the interfaces 3, 1, and 2 of the device 100B, respectively.

The traffic generation device 4 may apply traffic destined to each of the interfaces of the device 100A from the device 100B.

Figure 5:
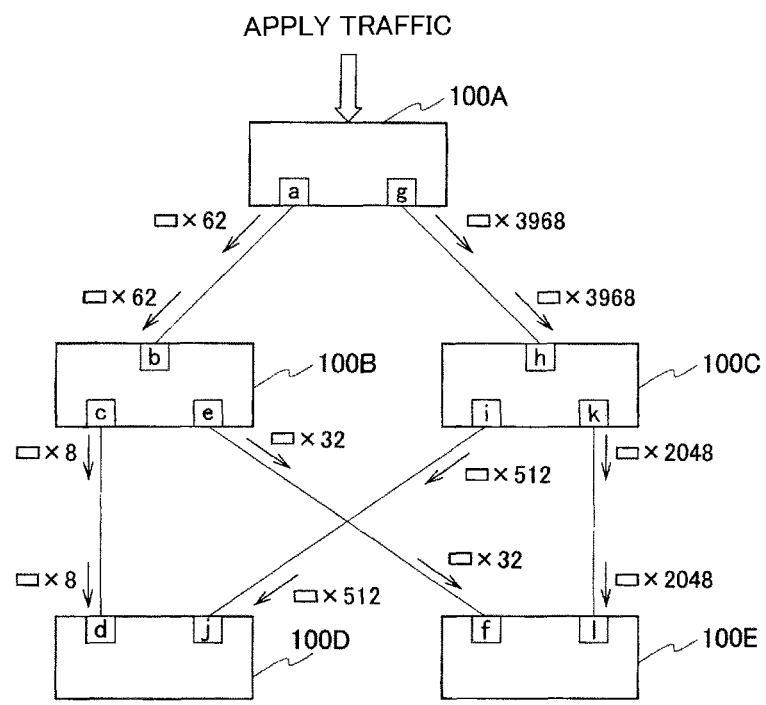
FIG. 5 is a diagram for explaining an embodiment of estimating the connection relationship of a plurality of devices constituting a ladder-type network.

With reference to FIG. 5, an embodiment of estimating the connection relationship of a plurality of devices constituting a ladder-type network will be described.

The network of FIG. 5 is composed of five devices 100A to 100E. The device 100E is a device of a backup system of the device 100D. Although not illustrated, two devices, an operating system and a backup system, may be similarly connected after the subsequent stages of the devices 100D and 100E.

The interfaces of the devices 100A to 100E and their IP addresses are known. Here, it is assumed that the IP addresses of the interfaces a and g of the device 100A are a and g, respectively, the IP addresses of the interfaces b, c and e of the device 100B are b, c and e, respectively, the IP addresses of the interfaces h, i, and k of the device 100C are h, i, and k, respectively, the IP addresses of the interfaces d and j of the device 100D are d and j, respectively, and the IP addresses of the interfaces f and l of the device 100E are f and l, respectively.

Figure 6:
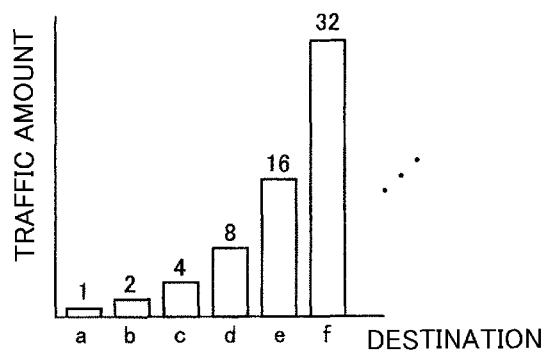
FIG. 6 is a diagram illustrating an example of the amount of traffic destined to each of the interfaces.

In the present embodiment, the traffic generation device 4 applies traffic destined to the interfaces a to l whose connection state is to be estimated to the device 100A. At this time, the traffic generation device 4 makes the amount of traffic applied different for each destination. The time to apply the traffic is uniform. As illustrated in FIG. 6, the traffic generation device 4 applies traffics in which the traffic amounts are different in a stepwise manner of a multiplier of 2 for all the IP addresses a to l corresponding to all the interfaces a to l to be analyzed. Specifically, assuming that the amount of traffic destined to the IP address a (hereinafter referred to as "reference traffic amount") is 1, the amounts of traffic to IP addresses b to l are set such that 2 times the reference traffic amount is applied to the IP address b, 4 times the reference traffic amount is applied to the IP address c, 8 times the reference traffic amount is applied to the IP address d, 16 times the reference traffic amount is applied to the IP address e, 32 times the reference traffic amount is applied to the IP address f, 64 times the reference traffic amount is applied to the IP address g, 128 times the reference traffic amount is applied to the IP address h, 256 times the reference traffic amount is applied to the IP address i, 512 times the reference traffic amount is applied to the IP address j, 1024 times the reference traffic amount is applied to the IP address k, and 2048 times the reference traffic amount is applied to the IP address l. As for the traffic amount for each destination, the total traffic amount may be different for all combinations of destinations.

Figure 7A:
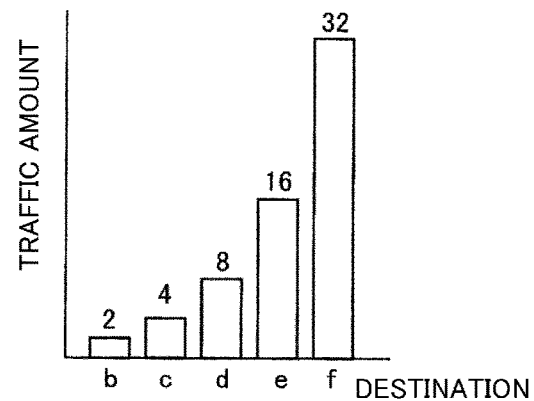
FIG. 7A is a diagram illustrating the amount of traffic flowing between interfaces.

The devices 100A to 100E transmit the input traffic to the devices on the subsequent stage according to the routing information. For example, traffic destined to the IP addresses b, c, d, e, and f is transmitted from the interface a of the device 100A, and is received by the interface b of the device 100B. That is, the amount of traffic corresponding to the total amount of traffic destined to the IP addresses b, c, d, e, and f illustrated in FIG. 7A flows from the interface a to the interface b. That is, the amount of traffic corresponding to 62 times (2+4+8+16+32) the reference traffic amount flows from the interface a to the interface b.

Figure 7B:
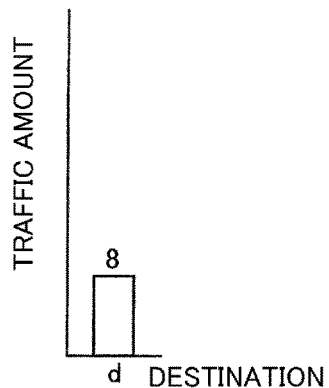
FIG. 7B is a diagram illustrating the amount of traffic flowing between interfaces.
Figure 7C:
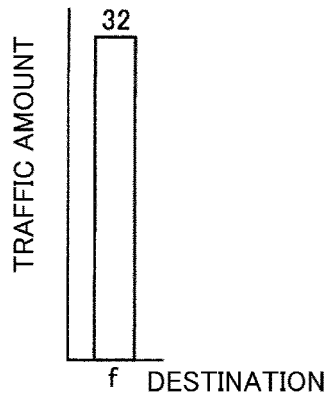
FIG. 7C is a diagram illustrating the amount of traffic flowing between interfaces.

Among the traffics received by the interface b, the device 100B transmits the traffic destined to the IP address d from the interface c, and transmits the traffic destined to the IP address f from the interface e. Traffic destined to the IP address d illustrated in FIG. 7B flows from the interface c to the interface d. This traffic amount is eight times the reference traffic amount. Traffic destined to the IP address f illustrated in FIG. 7C flows from the interface e to the interface f. This traffic amount is 32 times the reference traffic amount.

Similarly, an amount of traffic corresponding to 3968 times the reference traffic amount flows from the interface g to the interface h, an amount of traffic corresponding to 512 times the reference traffic amount flows from the interface i to the interface j, and an amount of traffic corresponding to 2048 times the reference traffic amount flows from the interface k to the interface l.

In this way, the traffic generation device 4 applies traffic so that the amount of flowing traffic is different in respective sets of connected interfaces whereby the topology estimation device 1 can estimate the connection relationship of the estimation target network from the correlation of the traffic between interfaces.

Figure 8:
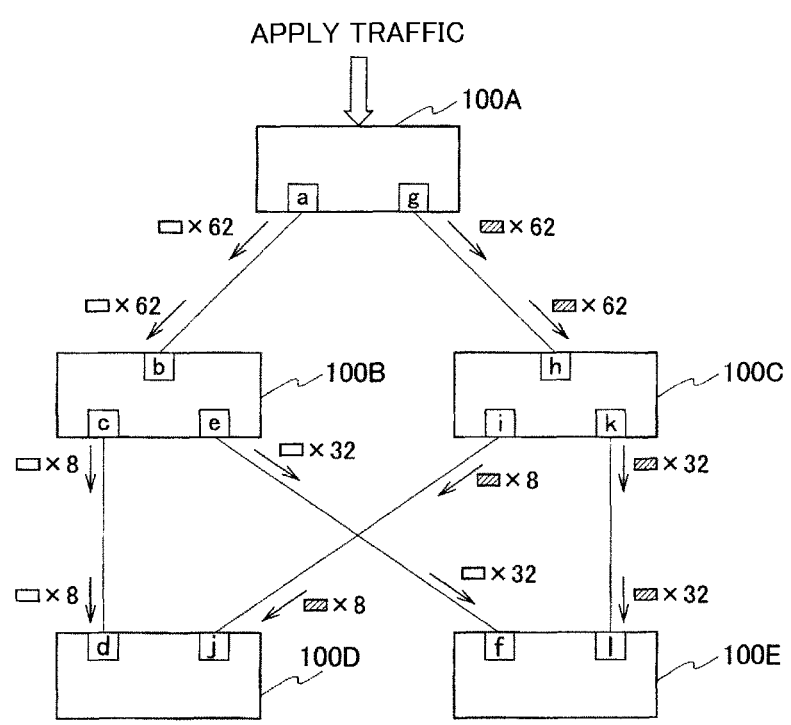
FIG. 8 is a diagram for explaining an embodiment of estimating the connection relationship of a plurality of devices constituting a ladder-type network in consideration of a network load.

An embodiment of estimating the connection relationship of a plurality of devices constituting the ladder-type network in consideration of the network load will be described with reference to FIG. 8. The network of FIG. 8 is configured in the same manner as the network of FIG. 5.

In the present embodiment, the destinations are subdivided into a plurality of groups, and the time slots for applying traffic are shifted for each group. The traffic generation device 4 applies traffic destined to each IP address to the device 100A for each time slot. For example, the traffic generation device 4 subdivides the IP addresses a to l in FIG. 8 into a group of IP addresses a to f and a group of IP addresses g to l. After the traffic destined to the IP addresses a to f is applied in the time slot T1, the traffic generation device 4 applies the traffic destined to the IP addresses g to l in the time slot T2. Traffics that are not transmitted in the same time slot may have the same amount of traffic.

Figure 9A:
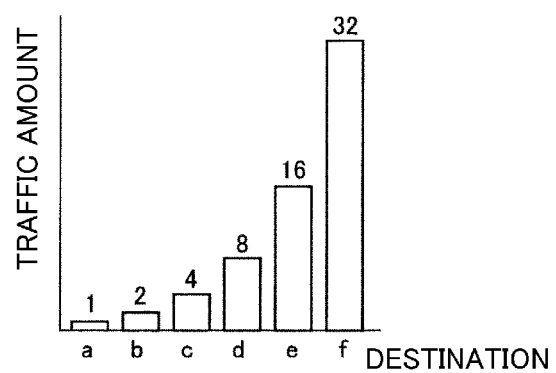
FIG. 9A is a diagram illustrating an example of the amount of traffic transmitted in a first time slot and destined to each of the interfaces.
Figure 9B:
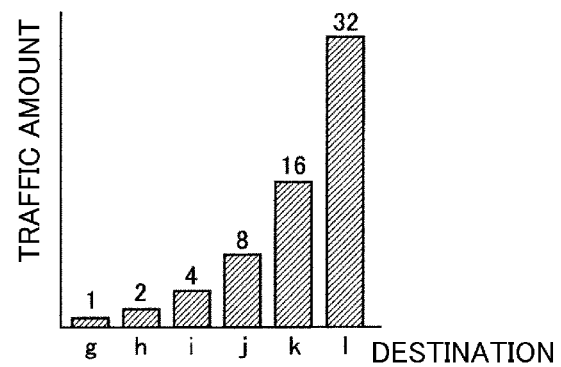
FIG. 9B is a diagram illustrating an example of the amount of traffic transmitted in a second time slot and destined to each of the interfaces.

Specifically, in the time slot T1, as illustrated in FIG. 9A, for the traffics destined to the IP addresses a to f, traffics in which the traffic amounts are different in a stepwise manner of a multiplier of 2 are applied. In the time slot T1, the traffic destined to the IP addresses g to l is not applied. In the time slot T2, as illustrated in FIG. 9B, for the traffics destined to the IP addresses g to l, traffics in which the traffic amounts are different in a stepwise manner of a multiplier of 2 are applied. In the time slot T2, the traffic to the IP addresses a to f is not applied.

The amounts of traffic transmitted in different time slots T1 and T2 may be the same. For example, the amount of traffic to the IP address a in FIG. 9A and the amount of traffic to the IP address g in FIG. 9B are the same. As for the traffic amount for each destination, the total traffic amount may be different for all combinations of destinations in the same time slots T1, T2. Compared with the embodiment of FIG.

5, in the embodiment of FIG. 8, the total amount of applied traffic can be reduced. Note that traffic may be applied to three or more time slots.

As described above, the topology estimation system of the present embodiment includes the traffic generation device 4 that applies traffic to an estimation target network and the topology estimation device 1 that estimates the connection relationship of interfaces from the correlation of the traffic data collected from the interfaces of the devices constituting the estimation target network. The traffic generation device 4 generates traffic having a different amount of traffic for each destination interface and applies the same to the estimation target network. The topology estimation device 1 estimates the connection relationship of the interfaces from the correlation of the traffic observed at each of the interfaces connected to each other on the basis of the traffic data collected from the estimation target network. As a result, the topology estimation system of the present embodiment can more accurately grasp the connection relationship of the interfaces in the network where the change in the traffic flow rate is small.

Second Embodiment

A topology estimation system of a second embodiment will be described with reference to FIG. 10. The topology estimation system illustrated in the figure includes a topology estimation device 1, a traffic generation device 4, and a traffic collection device 5. The topology estimation device 1 and the traffic collection device 5 are the same as those in the first embodiment.

Figure 10:
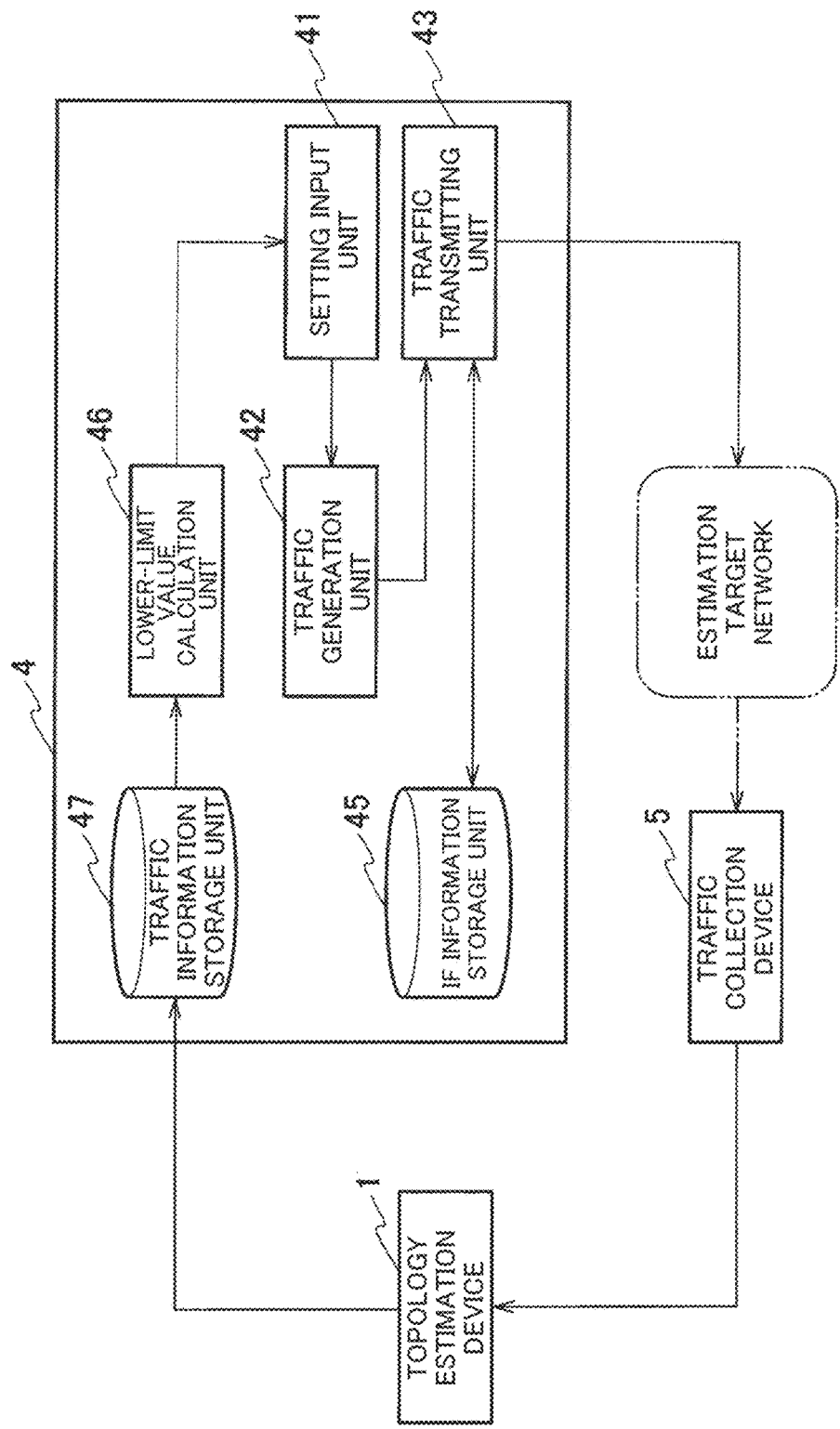
FIG. 10 is a diagram illustrating a configuration example of a topology estimation system of a second embodiment.

The traffic generation device 4 illustrated in FIG. 10 includes a setting input unit 41, a traffic generation unit 42, a traffic transmitting unit 43, an IF information storage unit 45, a lower-limit value calculation unit 46, and a traffic information storage unit 47.

The setting input unit 41 determines a traffic parameter such that a different feature amount appears in each set of interfaces connected to each other in the estimation target network. In the second embodiment, the setting input unit 41 sets the timing of applying traffic destined to each of the interfaces of the devices constituting the estimation target network so that the timing at which the traffic applied to each interface is observed is different.

The traffic generation unit 42 generates traffic to be transmitted at different timings for each destination interface on the basis of the parameters determined by the setting input unit 41.

The traffic transmitting unit 43 transmits the traffic generated by the traffic generation unit 42 to the estimation target network.

The IF information storage unit 45 holds information about the interfaces provided in the devices constituting the estimation target network. For example, for each of the interfaces, information such as an IP address corresponding to the interface is held.

The lower-limit value calculation unit 46 calculates the lower-limit value of the transmission time of the traffic so that different feature amounts appear in the traffic observed at each of the interfaces. For example, when traffic data is acquired every X minutes in the device constituting the estimation target network, the acquired traffic data is rounded to a cumulative value or an average value for X minutes. In the present embodiment, the lower-limit value calculation unit 46 obtains ½ or more of the data acquisition period as the lower-limit value of the transmission time so that different feature amounts appear in the traffic observed at each of the interfaces.

The traffic information storage unit 47 stores traffic data used by the lower-limit value calculation unit 46 for calculating the lower-limit value of the transmission time. The traffic data includes a time stamp at which the packet transmission/reception amount for each interface was acquired. In the present embodiment, the same traffic data as the traffic data collected by the traffic collection device 5 and input to the topology estimation device 1 is stored.

Figure 11:
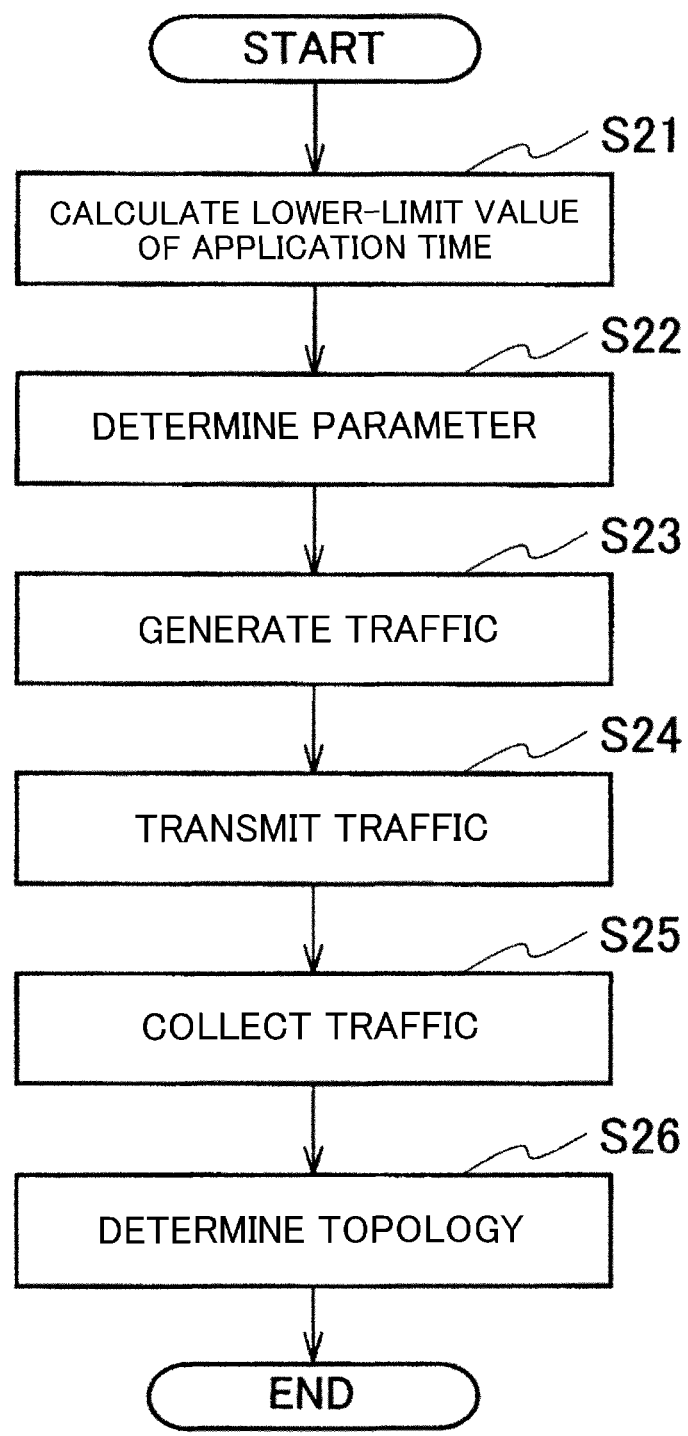
FIG. 11 is a flowchart illustrating a processing flow of the topology estimation system of the second embodiment.

The processing flow of the topology estimation system of the present embodiment will be described with reference to FIG. 11.

In step S21, the traffic generation device 4 calculates the lower-limit value of the traffic transmission time on the basis of the sampling interval of the traffic data in the devices constituting the estimation target network.

In step S22, the traffic generation device 4 acquires information on the interfaces of the devices constituting the estimation target network, and determines the parameters of the traffic destined to each of the interfaces so that the timing at which the applied traffic is observed at each of the interfaces is different. The parameters include, for example, the transmission timing and the transmission time of the packet to be transmitted as traffic. The traffic generation device 4 determines the parameters so that the traffic transmission time is equal to or greater than the lower-limit value calculated in step S21.

In step S23, the traffic generation device 4 generates traffic on the basis of the parameters determined in step S22.

In step S24, the traffic generation device 4 transmits the traffic generated in step S23 to the estimation target network.

In step S25, the traffic collection device 5 collects traffic data at each of the interfaces of the devices constituting the estimation target network.

In step S26, the topology estimation device 1 inputs the traffic data collected in step S25, estimates the topology of the estimation target network, displays the estimation result, and saves the estimation result in a file.

The calculation of the lower-limit value will be described with reference to FIG. 12.

Figure 12:
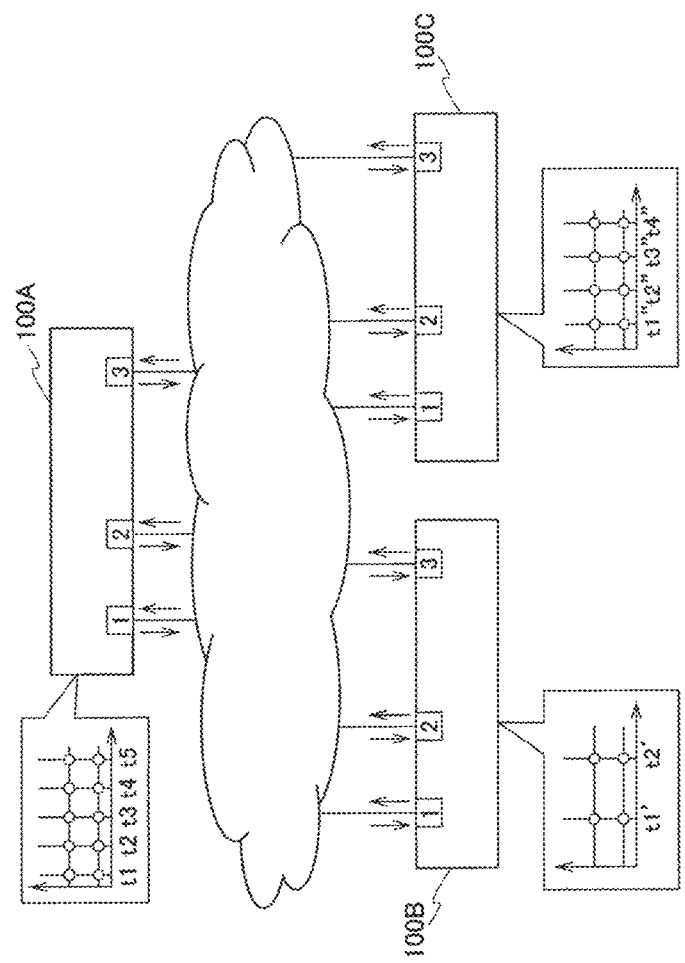
FIG. 12 is a diagram for explaining the calculation of the lower-limit value.

FIG. 12 illustrates three devices 100A, 100B, and 100C. The traffic collection device 5 collects traffic data from each of the devices 100A, 100B, and 100C. The traffic data is stored in the traffic information storage unit 47. The lower-limit value calculation unit 46 confirms the time stamp of the traffic data for each of the devices 100A, 100B, and 100C, and obtains the sampling interval of each of the devices 100A, 100B, and 100C. The lower-limit value calculation unit 46 extracts the largest sampling interval T and calculates the lower-limit value T/2 of the traffic application time.

In the example of FIG. 12, the time stamps of the traffic data of the device 100A are t1, t2, . . . , and so on, and the sampling interval is t. The time stamps of the traffic data of the device 100B are t1', t2', . . . , and so on, and the sampling interval is t'. The time stamps of the traffic data of the device 100C are t1", t2", . . . , and so on, and the sampling interval is t". Since the sampling interval t' of the device 100B is the largest, the lower-limit value calculation unit 46 calculates the lower-limit value as t'/2.

The setting input unit 41 receives the lower-limit value t'/2 from the lower-limit value calculation unit 46, and determines the transmission timing of the traffic destined to each interface on the basis of the lower-limit value t'/2.

Figure 13:
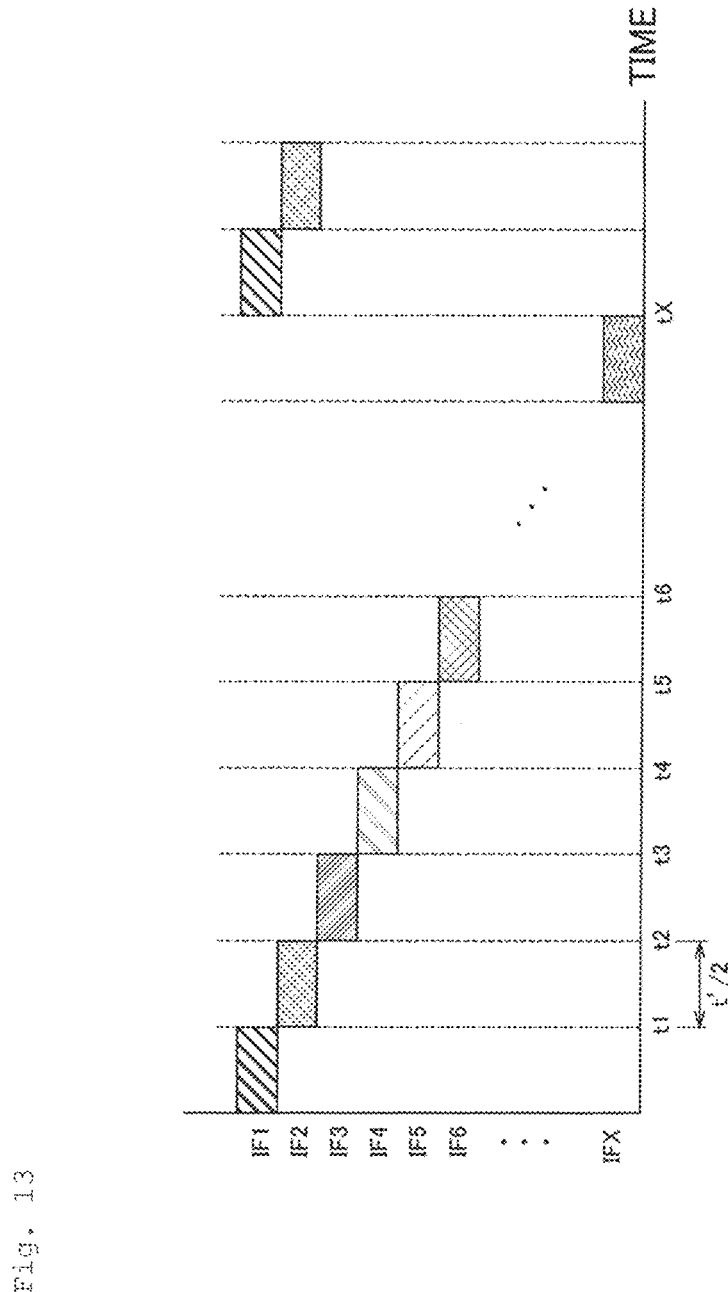
FIG. 13 is a diagram illustrating an example of transmission timing of traffic destined to each of the interfaces.

FIG. 13 is a diagram illustrating an example of transmission timing of traffic destined to each of the interfaces. As illustrated in the figure, the traffic to each interface is applied to the estimated target network so that the transmission timings do not overlap each other and the transmission time is equal to or higher than the lower-limit value t'/2.

An embodiment of estimating the connection relationship between two devices connected to face each other will be described with reference to FIG. 14.

Figure 14:
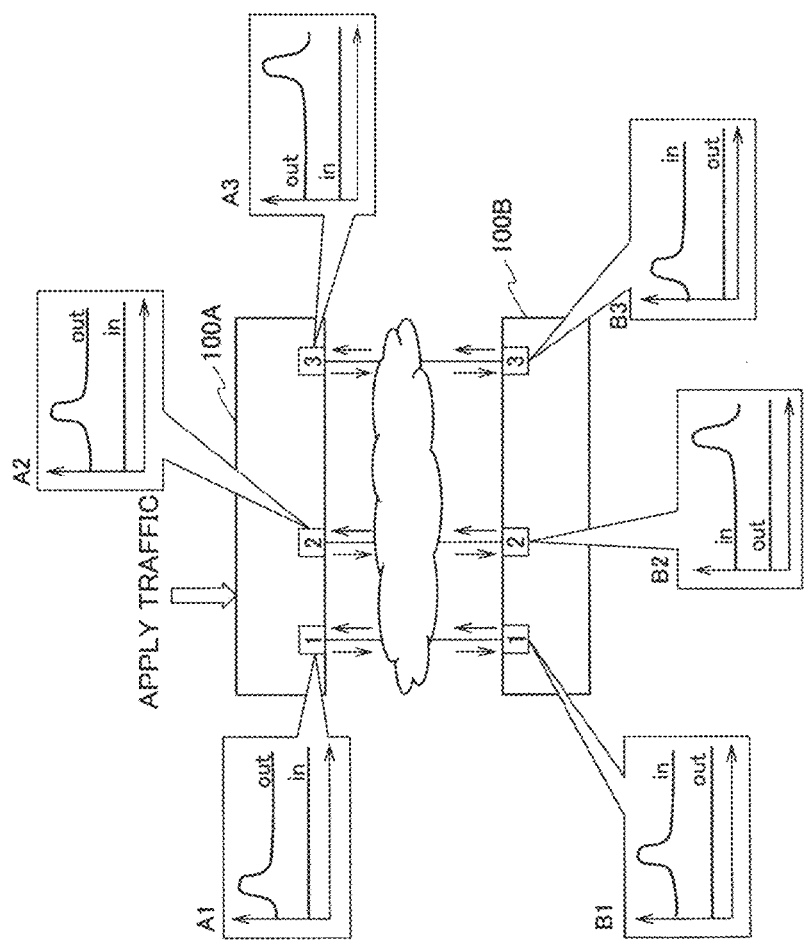
FIG. 14 is a diagram for explaining an embodiment of estimating the connection relationship between two devices connected to face each other.

In the example of FIG. 14, two devices 100A and 100B are connected to face each other. The devices 100A and 100B each include three interfaces. The number of interfaces of the devices 100A and 100B is an example for simplifying the explanation.

In the present embodiment, the traffic generation device 4 applies traffic destined to each of the interfaces of the device 100B from the device 100A. At this time, the traffic generation device 4 makes the timing of applying the traffic different for each destination so that the timings of applying the traffic do not overlap. The amount of traffic applied is uniform. The traffic collection device 5 collects traffic data at each of the interfaces of the devices 100A and 100B. The topology estimation device 1 estimates the connection relationship of the interfaces of the devices 100A and 100B from the correlation of the traffic data.

Each of the traffics destined to the interfaces of the device 100B applied to the device 100A is transmitted from the interface of the device 100A and received at the interface of the destination device 100B.

The traffic generation device 4 generates traffic whose timing is shifted for each destination, whereby the topology estimation device 1 can estimate the connection relationship from the correlation of the traffic data. In the example of FIG. 14, the change timing of the traffic flowing out from the interface 1 of the device 100A and the change timing of the traffic flowing into the interface 3 of the device 100B are correlated. The change timing of the traffic flowing out from the interface 2 of the device 100A and the change timing of the traffic flowing into the interface 1 of the device 100B are correlated. The change timing of the traffic flowing out from the interface 3 of the device 100A is correlated with the change timing of the traffic flowing into the interface 2 of the device 100B are correlated. Therefore, it can be estimated that the interfaces 1, 2, and 3 of the device 100A are connected to the interfaces 3, 1, and 2 of the device 100B, respectively.

The traffic generation device 4 may log into the device 100A and transmit traffic from each of the interfaces 1 to 3 of the device 100A so that the transmission times do not overlap. Further, the traffic generation device 4 may apply traffic destined to each of the interfaces of the device 100A from the device 100B.

Figure 15:
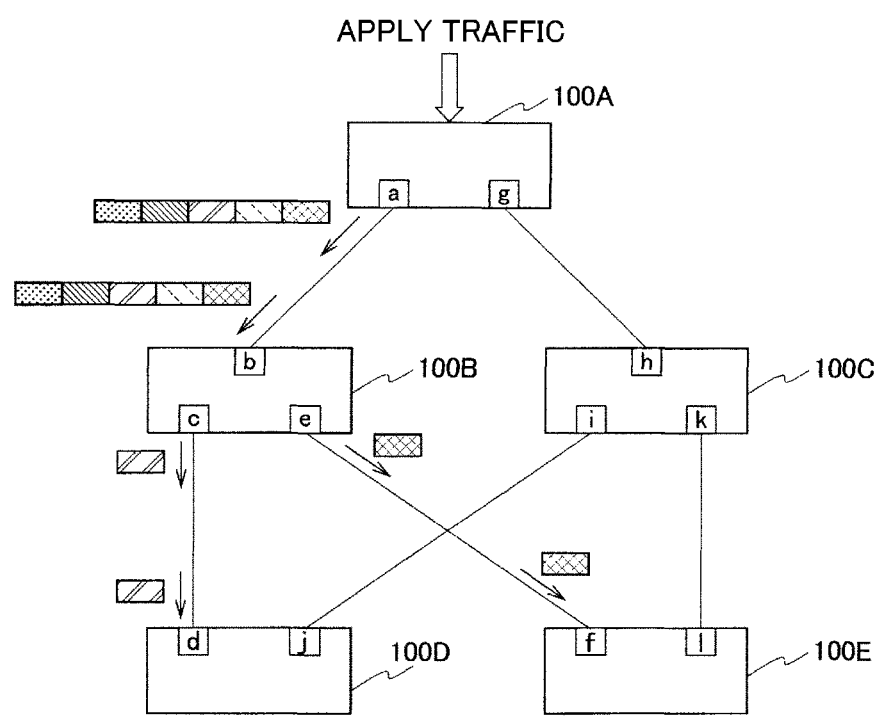
FIG. 15 is a diagram for explaining an embodiment of estimating the connection relationship of a plurality of devices constituting a ladder-type network.

An embodiment of estimating the connection relationship of a plurality of devices constituting the ladder-type network will be described with reference to FIG. 15. The network of FIG. 15 is configured in the same manner as in FIGS. 5 and 8.

In the present embodiment, the traffic generation device 4 applies traffic destined to the IP addresses corresponding to the interfaces whose connection states are to be estimated to the device 100A. At this time, the traffic generation device 4 makes the timing of applying the traffic different for each destination. The amount of traffic applied is uniform. For example, the traffic generation device 4 transmits the traffic to the IP address a between time points t0 and t1, the traffic to the IP address b between time points t1 and t2, the traffic to the IP address c between time points t2 and t3, the traffic to the IP address d between time points t3 and t4, the traffic to the IP address e between time points t4 and t5, and the traffic to the IP address f between time points t5 and t6. Similarly, traffics to the IP addresses g to l are transmitted at shifted time points.

Figure 16A:
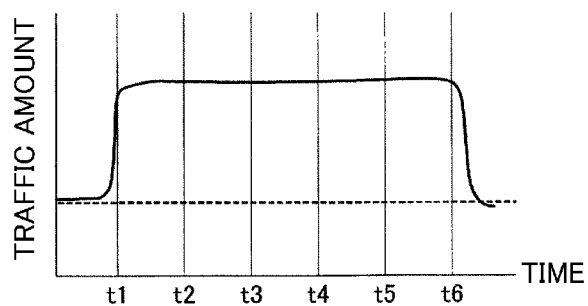
FIG. 16A is a diagram illustrating the time during which traffic flows between interfaces.
Figure 16B:
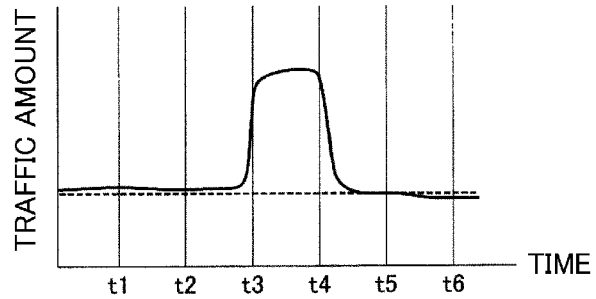
FIG. 16B is a diagram illustrating the time during which traffic flows between interfaces.
Figure 16C:
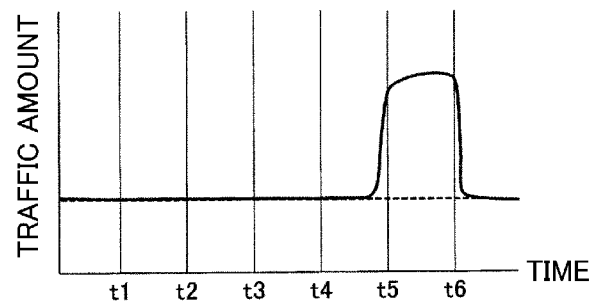
FIG. 16C is a diagram illustrating the time during which traffic flows between interfaces.

The devices 100A to 100E transmit the input traffic to the devices on the subsequent stage according to the routing information. For example, traffic destined to the IP addresses b, c, d, e, and f is transmitted from the interface a of the device 100A, and is received by the interface b of the device 100B. That is, as illustrated in FIG. 16A, traffic destined to any of the IP addresses b, c, d, e, and f flows from the interface a to the interface b during the time t1 to t6. Among the traffics received by the interface b, the device 100B transmits the traffic destined to the IP address d from the interface c, and transmits the traffic destined to the IP address f from the interface e. As illustrated in FIG. 16B, traffic destined to the IP address d flows from the interface c to the interface d during the time t3 to t4. As illustrated in FIG. 16C, traffic destined to the IP address f flows from the interface e to the interface f during the time t5 to t6.

In this way, the traffic generation device 4 applies traffic so that the timing and the time of flowing traffic is different in respective sets of connected interfaces whereby the topology estimation device 1 can estimate the connection relationship of the estimation target network from the correlation of the traffic between interfaces.

In the network of FIG. 15, a plurality of traffic generation devices 4 may be used, and traffic may be applied at the same timing from the plurality of devices 100A, 100B, 100C so that the traffic is applied to respective destinations at different timings. Specifically, the plurality of traffic generation devices 4 transmit traffic from the plurality of devices 100A, 100B, and 100C so that the traffic to the IP address a is transmitted between the time points t0 and t1, the traffic to the IP address b is transmitted between the time points t1 and t2, the traffic to the IP address c is transmitted between the time points t2 and t3, the traffic to the IP address d is transmitted between the time points t3 and t4, the traffic to the IP address e is transmitted between the time points t4 and t5, and the traffic to the IP address f is transmitted between the time points t5 and t6. Similarly, the plurality of traffic generation devices 4 transmit the traffics to the IP addresses g to l from the plurality of devices 100A, 100B, and 100C at shifted timings.

As described above, the traffic generation device 4 of the present embodiment generates traffic whose transmission time is shifted for each destination interface and applies the same to the estimation target network. The topology estimation device 1 estimates the connection relationship of the interfaces from the correlation of the traffic observed at each of the interfaces connected to each other on the basis of the traffic data collected from the estimation target network. As a result, the topology estimation system of the present embodiment can more accurately grasp the connection relationship of the interfaces in the network where the traffic flow rate does not change.

Figure 17:
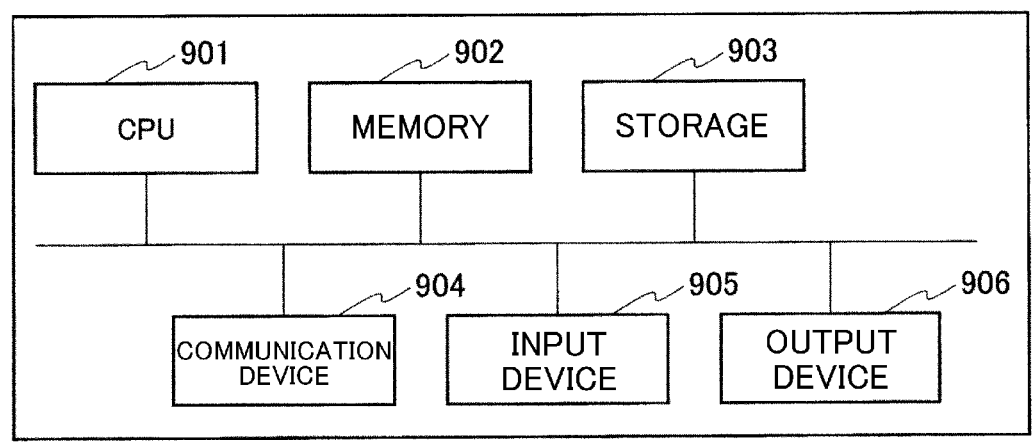
FIG. 17 is a diagram illustrating an example of a hardware configuration of a traffic generation device.

As the traffic generation device 4 of the first and second embodiments described above, for example, a general-purpose computer system including a central processing unit (CPU) 901, a memory 902, a storage 903, a communication device 904, an input device 905, and an output device 906 can be used as illustrated in FIG. 17. In this computer system, the traffic generation device 4 is realized by the CPU 901 executing a predetermined program loaded on the memory 902. This program can be recorded on a computer-readable recording medium such as a magnetic disk, an optical disc, or a semiconductor memory, or can be distributed via a network. The traffic generation device 4 may be implemented by one computer or may be implemented by a plurality of computers. Further, the traffic generation device 4 may be implemented in a virtual machine on the cloud.

REFERENCE SIGNS LIST

1 Topology estimation device
4 Traffic generation device
41 Setting input unit
42 Traffic generation unit
43 Traffic transmitting unit
44 Time slot control unit
45 IF information storage unit
46 Lower-limit value calculation unit
47 Traffic information storage unit
5 Traffic collection device

The invention claimed is:

1. A topology estimation system that is configured to estimate a connection relationship of interfaces of a plurality of devices, comprising:
a topology estimation device, including one or more processors, that is configured to estimate the connection relationship of the interfaces in a target network from a correlation of one or more packets observed at each of the interfaces connected to each other; and
a traffic generation device, including one or more processors, that is configured to generate the one or more packets to be transmitted to the interfaces in the target network, the traffic generation device configured to:
determine parameters for transmitting the one or more packets to each of the interfaces in the target network, wherein the parameters for transmitting comprise a size of each packet and a transmission time for each packet of the one or more packets, and the parameters for transmitting comprise an amount of the one or more packets observed at each of the interfaces to be unique;
generate, for each of the interfaces, the one or more packets according to the determined parameters for transmitting; and
transmit the one or more packets to the interfaces in the target network.

2. A traffic generation device that is configured to generate one or more packets for estimating a connection relationship of interfaces connected to each other from a correlation of the one or more packets observed at each of the interfaces, the traffic generation device comprising one or more processors configured to:
determine parameters for transmitting the one or more packets to each of the interfaces in a target network, wherein the parameters for transmitting comprise a size of each packet and a transmission time for each packet of the one or more packets, and the parameters for transmitting comprise an amount of the one or more packets observed at each of the interfaces to be unique;
generate, for each of the interfaces, the one or more packets according to the determined parameters for transmitting; and
transmit the one or more packets to the interfaces.

3. The traffic generation device according to claim 2, wherein the one or more processors are configured to:
generate a different size of a packet of the one or more packets for each of the interfaces.

4. The traffic generation device according to claim 3, wherein the one or more processors are configured to:
subdivide each of the interfaces into a plurality of groups and generate the one or more packets so as to be transmitted at a different timing for each group.

5. The traffic generation device according to claim 2, wherein the one or more processors are configured to:
generate the one or more packets so as to be transmitted at a different timing for each of the interfaces.

6. The traffic generation device according to claim 5, wherein the one or more processors are configured to calculate a lower-limit value of a transmission time of the one or more packets on a basis of a traffic sampling interval at a corresponding interface.

7. A method of generating one or more packets for estimating a connection relationship of interfaces connected to each other from a correlation of the one or more packets observed at each of the interfaces, comprising:
determining parameters for transmitting the one or more packets to each of the interfaces in a target network, wherein the parameters for transmitting comprise a size of each packet and a transmission time for each packet of the one or more packets, and the parameters for transmitting comprise an amount of the one or more packets observed at each of the interfaces to be unique;
generating, for each of the interfaces, the one or more packets according to the determined parameters for transmitting; and
transmitting the one or more packets to the interfaces.

8. The topology estimation system according to claim 1, wherein the one or more processors are configured to generate a different amount of one or more packets for each of the interfaces.

9. The topology estimation system according to claim 8, wherein the one or more processors are configured to subdivide each of the interfaces into a plurality of groups and generate the one or more packets so as to be transmitted at a different timing for each group.

10. The topology estimation system according to claim 1, wherein the one or more processors are configured to generate the one or more packets so as to be transmitted at a different timing for each of the interfaces.

11. The topology estimation system according to claim 10, wherein the one or more processors are configured to calculate a lower-limit value of a transmission time of the one or more packets on a basis of a traffic sampling interval at a corresponding interface.

12. The method according to claim 7, comprising:
generating a different size of a packet of the one or more packets for each of the interfaces.

13. The method according to claim 12, comprising:
subdividing each of the interfaces into a plurality of groups and generate the one or more packets so as to be transmitted at a different timing for each group.

14. The method according to claim 7, comprising:
generating the one or more packets so as to be transmitted at a different timing for each of the interfaces.

15. The method of claim 14, comprising:
calculating a lower-limit value of a transmission time of the one or more packets on a basis of a traffic sampling interval at a corresponding interface.

16. The topology estimation system of claim 1, wherein the connection relationship of the interfaces in a target network comprises the connection relationship of the interfaces between devices in the target network.

17. The topology estimation system of claim 1, wherein the amount of the one or more packets observed at each of the interfaces for the one or more packets differ in a stepwise manner of a multiplier 2 across each of the interfaces.

\* \* \* \* \*